(No Model.) 2 Sheets—Sheet 2.
H. A. FRASCH.
ART OF MANUFACTURING AMMONIA.
No. 515,909. Patented Mar. 6, 1894.
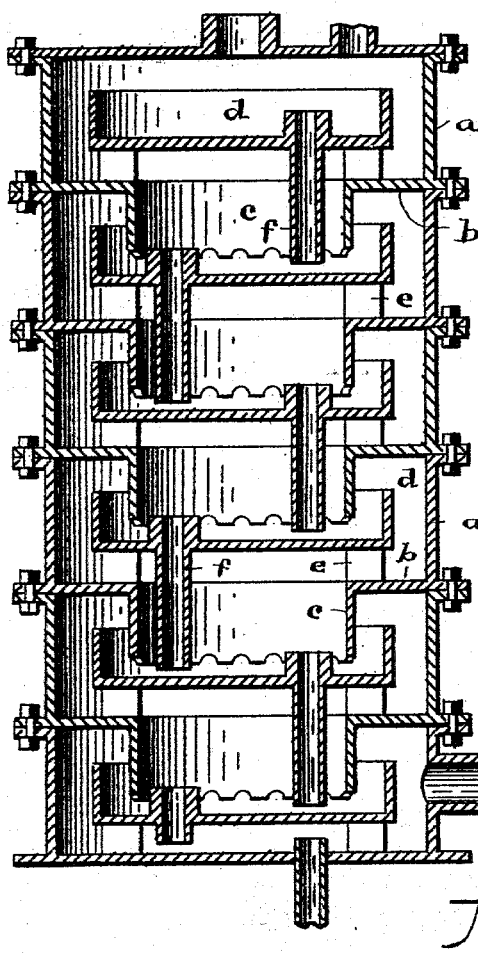
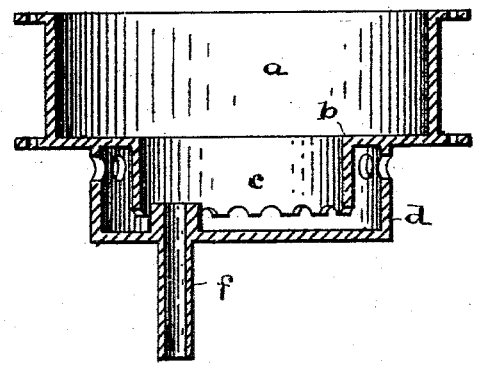
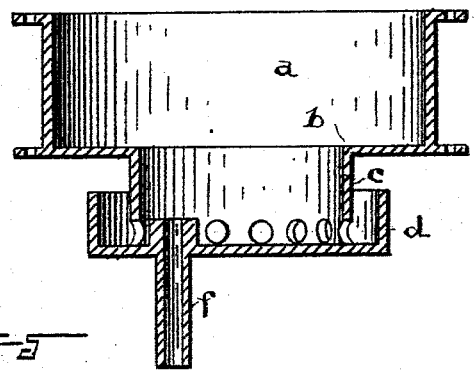
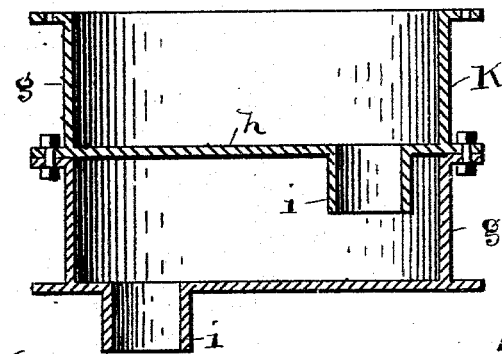
Attest.
R. D. Moser
Georgia Schaeffer
Inventor
Hans A. Frasch
By H. T. Fisher Attorney

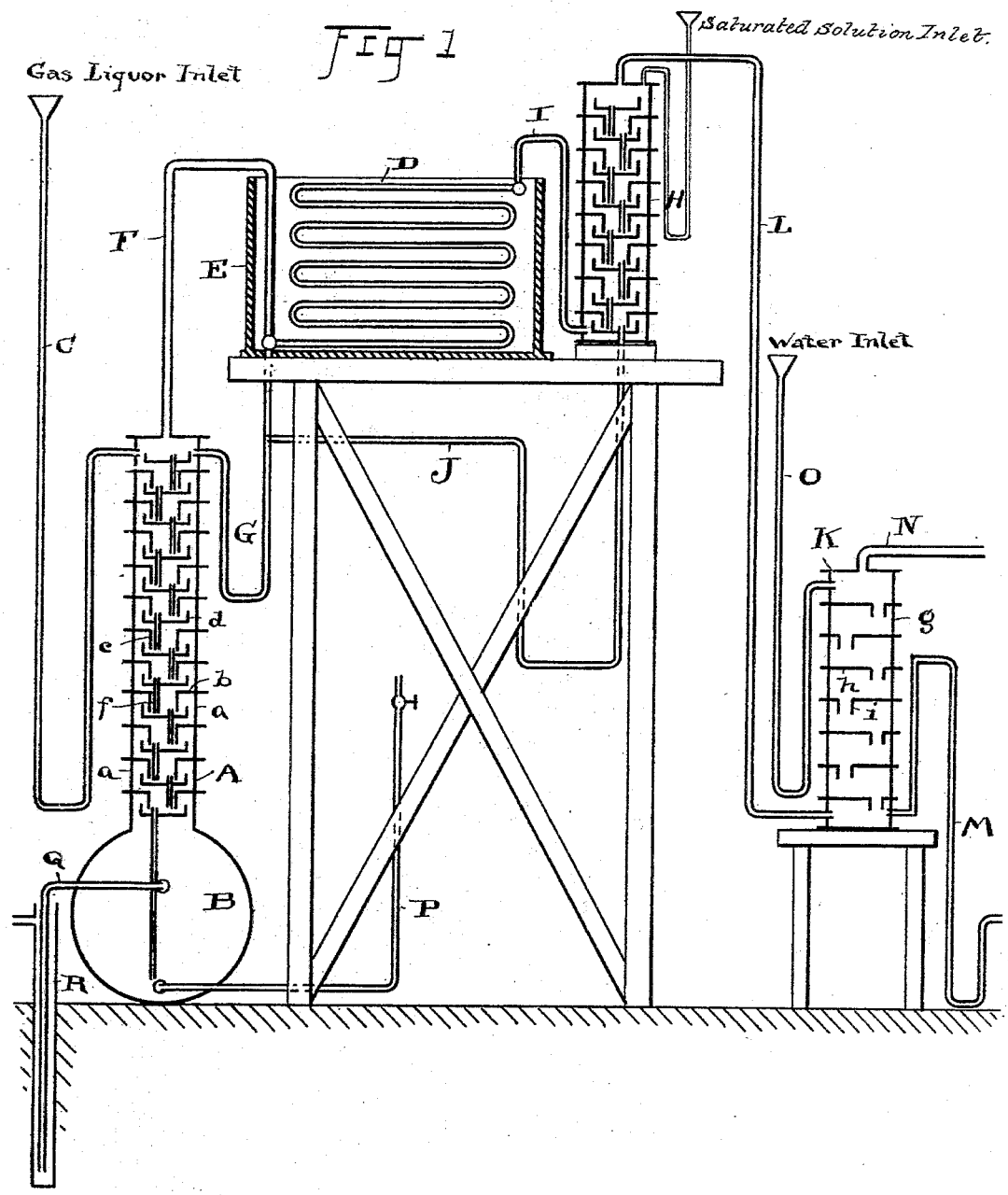

UNITED STATES PATENT OFFICE.

HANS A. FRASCH, OF CLEVELAND, OHIO.

ART OF MANUFACTURING AMMONIA.

SPECIFICATION forming part of Letters Patent No. 515,909, dated March 6, 1894.

Application filed April 15, 1893. Serial No. 470,417. (No model.)

*To all whom it may concern:*

Be it known that I, HANS A. FRASCH, a citizen of the United States, residing at Cleveland, in the county of Cuyahoga and State of Ohio, have invented certain new and useful Improvements in the Art of Manufacturing Ammonia; and I do hereby declare that the following is a full, clear, and exact description of the invention, which will enable others skilled in the art to which it appertains to make and use the same.

In the distillation of ammonia from gas liquor, and more especially in the manufacture of sodium carbonate by the ammonia process, certain volatile pyridin bases and other organic products contained in the liquor, distill and condense with the ammonia, and thereby discolor and otherwise deteriorate the ammonia products. Designating these deleterious substances as impurities, I may say that I have found that they volatilize at as low a temperature as 100° Fahrenheit. In the ordinary ammonia apparatus where the gas-liquor is fed into a steam-heated still-tower or analyzer at the upper end and the ammonia vapor escapes from such analyzer past the incoming gas-liquor, the temperature of no part of such analyzer is at any time sufficiently low to permit of the gas-liquor taking up any considerable portion of the impurities in the vapor; moreover, gas-liquor seldom contains as much as three per cent. of absolute ammonia, while a cold saturated solution contains as much as twenty-nine and a half per cent. It will thus be seen that unless provision be made for reducing the temperature of the vapors as they pass from the still below the temperature of the still itself before it is attempted to remove the aforesaid impurities, the product of aqua-ammonia will still be discolored and otherwise deteriorated. A large inflow of weak gas-liquor, containing not over three per cent. of ammonia is constantly fed to the analyzer, and the amount of ammonia produced in the analyzer is utterly insufficient to make a cold saturated solution in or of so large a quantity of gas-liquor even should the temperature be kept at 100° Fahrenheit, or lower as my process requires. In all apparatus to me known a condenser is used to condense the steam carried over with the ammoniacal vapor in order to produce aqua-ammonia of proper strength and hence it is evident that it is not contemplated as possible to secure in the analyzer sufficiently dehydrated vapors.

The object of my invention is to overcome this difficulty and to produce a practically pure ammonia.

In practicing my invention, I utilize the fact that ammonia and non-volatile liquids which absorb ammonia to saturation, while refusing to take up a further quantity of ammonia, will, however, absorb or combine the pyridin and other impurities referred to, and thus act as a washer for the further supply of ammonia gas.

In the accompanying drawings illustrating my invention, in the several figures of which like parts are similarly designated, Figure 1 is a sectional elevation of the apparatus; Fig. 2 a cross section, on a larger scale, of several of the connected sections comprising the still and wash columns; and Figs. 3 and 4 similar views of modifications, and Fig. 5 is a similar view of the absorber sections.

A is the still column, mounted on a steam drum B and having the gas-liquor induct pipe C.

D is a coil of pipe contained in a cooling tank E and connected with the still column by pipe F.

G is a return pipe from the cooling coil to the still column.

H is the wash column or tower into which the cooling coil opens through pipe I, this wash column also having a return pipe J to the still column.

K is the absorber, connected with the wash column by the pipe L, and having an outlet M for the aqua ammonia and an outlet N for waste gases, and an inlet O for the water or other absorbent.

Steam is supplied to the drum B through pipe P and an overflow or equalizing pipe Q leads from this drum to a well R to prevent the blowing out of the apparatus.

Certain peculiarities in the construction of the preferred form of still tower or column and wash tower or column and the absorber will now be described; and inasmuch as the still tower and the wash tower, as herein shown, are of the same construction, the description of one will suffice for both. The tower is composed of a series of sections $a$, having horizontally projecting flanges at top and bottom, open at the top, and having a horizontal bottom $b$, from at or about the center of which is a downwardly projecting annular flange $c$. A number of these sections are bolted together by their adjacent flanges and between each section and below its flange is arranged a dish or vessel $d$ of substantially the cross section shown, which may be supported upon the bottom of the next lower section by blocks or feet, or other supports $e$ at an appropriate height from the bottom of the flange. Each dish or vessel $d$ is supplied with an overflow pipe $f$ which projects up into the space of the flange of the upper section and down into the vessel below the next lower section. Instead of having the dishes or vessels separate from the sections and supported upon blocks, as described, each section may have its appropriate dish or vessel cast to its bottom, as shown in Fig. 3, or the said dish or vessel may be cast to the flange, as shown in Fig. 4, and in either case openings will be made to permit the passage of the vapors past the said vessel and the flange. The vessels $d$ are supplied with the liquid which is being treated, and this liquid stands in the said vessels normally to a level just below the level of the overflow pipes $f$, so that the flanges of the sections are liquid-sealed in said vessels, and so also are the bottoms of the overflow pipes $f$. The absorber is likewise composed of a series of sections $g$, made with top and bottom flanges, whereby they may be bolted together to form a column of proper height. The tops of these sections $g$ are open and the bottoms $h$ are made with flanged outlets $i$ in such manner that the outlet of each section projects into the body of the next lower section, and I prefer to arrange these outlets so that the outlets of adjacent sections shall be out of line with one another. The absorber is supplied with water to the desired height in a practically solid column, and as the vapor enters it, the vapor collects between the surface of the water and the bottom of the next higher section until the water is displaced sufficiently for the vapor to pass beneath the outlet and so escape into the section next above and thus the vapor is thoroughly washed. The pipe M is, by preference, attached to the lowest section of the series of sections and is made with an upward bend to the height it is desired to have the absorbing liquid stand in the absorber, and thence descends to the outlet.

The operation is substantially as follows: The liquor to be distilled enters the column A at the top, while steam is admitted from the drum. The vapors coming through this column, pass through the cooling device, the water of condensation flows back into the column A, and the ammonia gas leaves the condenser and passes into the washer. This washer is supplied with a saturated solution as hereinabove referred to, which, while it takes up the impurities, permits the gas to pass thence to the absorber, and from the absorber the gas passes onto the saturator.

The still A and the wash tower H, in the form shown, or in modifications thereof, may be used in the distillation of alcohol, petroleum, glycerine, and for other purposes, and while I have shown and described them in connection with an ammonia still, I wish to be understood as including within the scope of my invention their use for whatever purposes to which they may be applied.

While I prefer to employ the apparatus and its several parts herein shown and described for the practice of my process, yet I do not wish to be understood as limiting my process to the employment of such apparatus in whole or in part. For example, the saturated solution of ammonia may be used in any kind of receptacle.

What I claim is—

1. The improvement in the art of producing ammonia by distillation which consists in distilling the ammoniacal liquor, then cooling the vapors coming off from the still and separating out the condensed matter, then passing the cooled and dehydrated ammoniacal vapors through a saturated solution of ammonia which is maintained at a temperature which adapts it to take up the pyridin and kindred impurities, and then absorbing the vapors, substantially as described.

2. An apparatus for distilling ammonia, consisting in a still column, a cooling device for separating the ammoniacal vapors and condensing the aqueous matter, a column containing a saturated solution of ammonia through which the ammonia vapors pass directly from the cooling device, and an absorber, all combined and arranged in the order stated, and adapted to operate, substantially as described.

Witness my hand to the foregoing specification.

HANS A. FRASCH.

Witnesses:
H. T. FISHER,
GEORGIA SCHAEFFER.